United States Patent [19]

Bunsen et al.

[11] Patent Number: 5,089,980

[45] Date of Patent: Feb. 18, 1992

[54] DOUBLE KEYSTROKE FRACTION ENTRY AND INTERFACE METHOD

[75] Inventors: Chris M. Bunsen; Bruce A. Stephens, both of Corvallis, Oreg.

[73] Assignee: Hewlett-Packard Company, Palo Alto, Calif.

[21] Appl. No.: 648,680

[22] Filed: Jan. 31, 1991

Related U.S. Application Data

[63] Continuation-in-part of Ser. No. 429,437, Oct. 30, 1989, Pat. No. 5,025,403.

[51] Int. Cl.$^5$ .............................................. G06F 3/02
[52] U.S. Cl. .............................................. 364/709.07
[58] Field of Search ................ 364/709.07, 710.06, 364/710.09; 235/145 R

[56] References Cited

U.S. PATENT DOCUMENTS

| | | | |
|---|---|---|---|
| 4,081,859 | 3/1978 | Goldsamt et al. | 364/709.07 |
| 4,488,250 | 12/1984 | Lipsey et al. | 364/709.07 |
| 4,545,022 | 10/1985 | Hughins | 364/709.07 |
| 4,744,044 | 5/1988 | Stover et al. | 364/737 |

FOREIGN PATENT DOCUMENTS

| | | | |
|---|---|---|---|
| 52-38857 | 3/1977 | Japan | 364/709.07 |
| 52-48927 | 4/1977 | Japan | 364/709.07 |
| 52-48928 | 4/1977 | Japan | 364/709.07 |

*Primary Examiner*—Tan V. Mai

[57] ABSTRACT

In a calculating device, a method to allow a user to enter fractions in the form "b/c", where "b" and "c" are integers; "b/c" is a fraction; and the denominator "c" is within a prespecified range. The method to enter real number fractions includes activating one or more digit keys and the successive pressing of a primary function key to distinguish the previously entered numerator value from a subsequently entered denominator value.

9 Claims, 3 Drawing Sheets

DOUBLE KEYSTROKE FRACTION ENTRY AND INTERFACE METHOD

RELATED APPLICATION DATA

This application is a continuation-in-part of U.S. patent application Ser. No. 429,437, filed Oct. 30, 1989, now U.S. Pat. No. 5,025,403.

FIELD OF THE INVENTION

The present invention relates to the method and apparatus for entering and displaying fractions in a calculating device.

BACKGROUND OF THE INVENTION

Typically, in order to perform mathematical equations which incorporate fractions, it has first been necessary for a user of a calculating device to manipulate the fraction into decimal form, or reduce it, or in some other way conform it to a lengthy format before it can be entered into, and used by, the calculating device. Consequently, the amount of effort (i.e., the number of keystrokes) required by a user to perform useful functions on such a calculator was excessive.

There have been efforts to make calculating devices which implement the use of the fraction format:

"a b/c" or "b/c."

Unfortunately, these attempts have been useful for dedicated applications only. One such attempt has been an interface method for figuring fluctuating stock price fractions. Despite the use of fractional number format entry, these calculators and methods of fraction input required numerous keystrokes and thus are susceptible to human error or the use of dedicated keys that are expensive in terms of cost and keyboard area to implement.

In accordance with the preferred embodiment of the present invention, method and apparatus for solution of mathematical problems involving pure fractional number inputs is set out. The method allows for the simple implementation of fractional numbers into mathematical equations. Once entered, the fractions may be manipulated, transformed into decimal format or stored. The preferred embodiment shows a method wherein computations incorporating fractional numbers may be performed utilizing a minimum of keystrokes without the need for shift keys or additional dedicated keys.

SUMMARY OF THE INVENTION

The preferred embodiment is particularly directed to the use of two successive key activations of a single key, although embodiments with different keys are also possible.

The foregoing and additional features and advantages of the present invention will be more readily apparent from the following detailed description, which proceeds with reference to the accompanying drawings.

DETAILED DESCRIPTION OF A PREFERRED EMBODIMENT

The Apparatus

Figure 1:
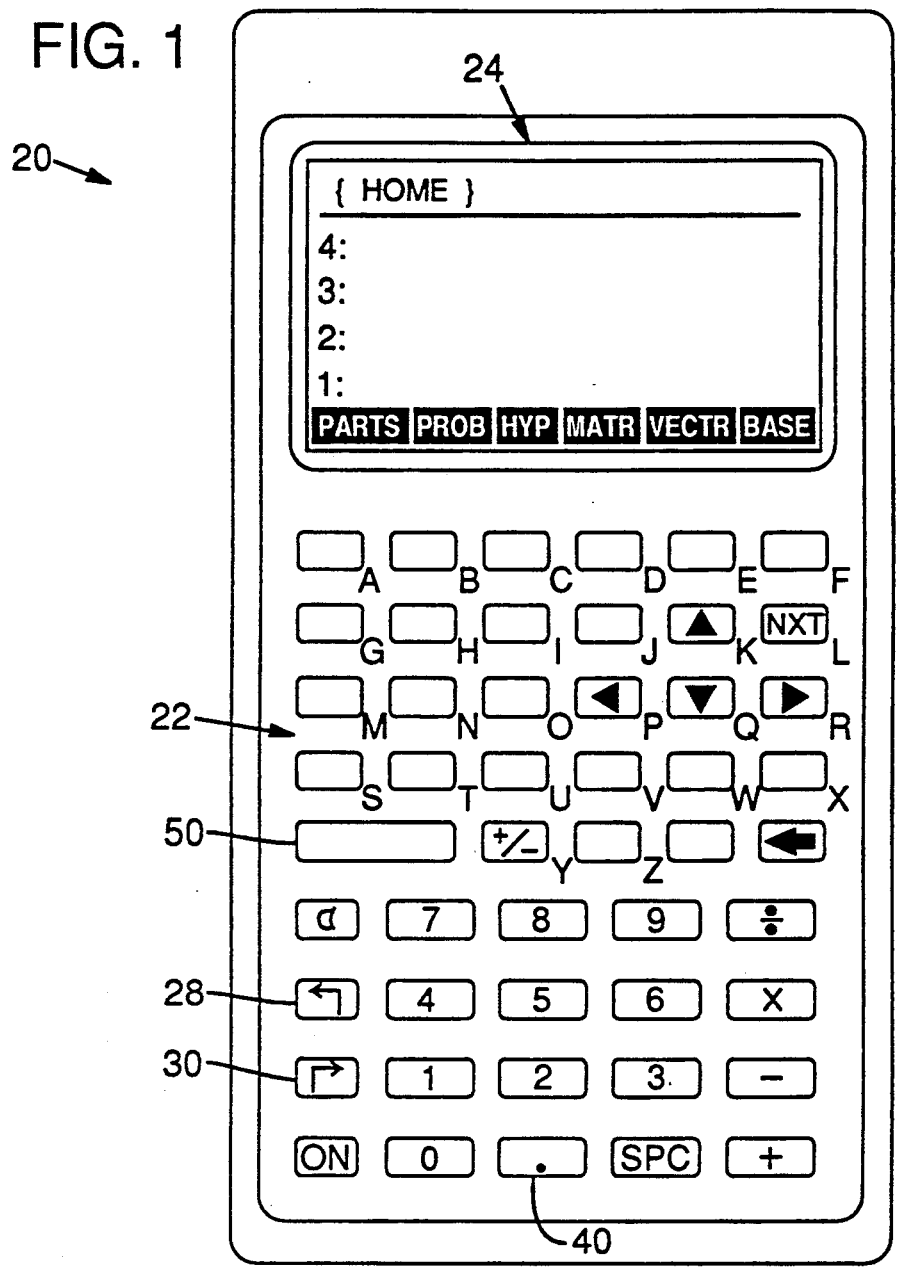
FIG. 1 shows the keyboard and display of a calculating device in accordance with the present invention.
Figure 2:
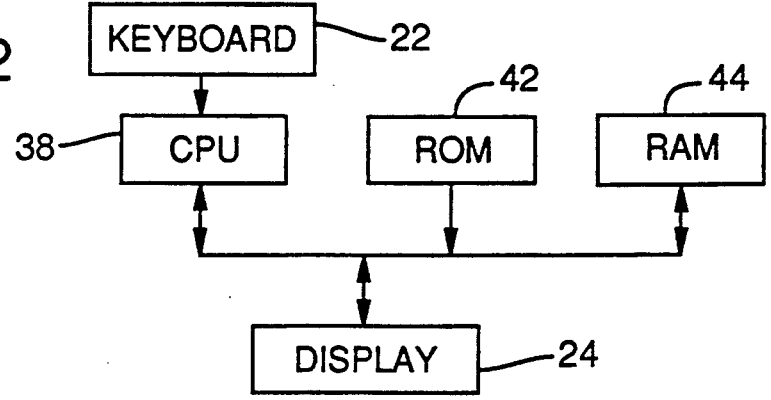
FIG. 2 shows the internal architecture of the calculating device of FIG. 1.

FIG. 1 shows a typical calculator 20 for use with the present invention. The hardware and architecture of the calculator 20 (shown in FIG. 2) may be of conventional design. The calculator includes an entry means such as a keyboard 22 and a display means such as an LCD display 24. On the face of the keyboard are a plurality of keys that each have a number of functions. Relevant to the present invention are a number of keys: a decimal point entry key 40; left and right shift keys 28 and 30 respectively; the digit keys 0-9; and an ENTER key 50. Keys such as those mentioned above are typically multifunctional. Each has a primary function that is executed immediately upon activation (pressing) of a single key. This function normally appears on the face of the key. Secondary functions are executed by first pressing a shift key 28 or 30. A secondary function is thus one that requires at least two keystrokes and is not immediately executed by a single keystroke.

The architecture of calculator 20 includes a central processing unit (CPU) 38 to which are connected via various buses the keyboard 22, the display 24 and separate memory in the form of ROM 42 and RAM 44. The instructions for operating the CPU may be stored in the ROM 42 in a conventional manner. The RAM 44 is available for storing data entered via the keyboard 22 and data generated by the CPU 38 in the process of performing calculations. Flag and memory stack registers are also provided, typically in other memory associated with CPU 38.

It will be understood that any equivalent calculating device may be used, such as a general purpose computer. Equivalent to the keyboard would be any data entry device such as a mouse. Equivalent to the LCD display would be any type of display device such as a CRT, hard copy device, etc.

The Method

The present invention allows the user to enter and display fractions in device 20, and to perform mathematical operations on them. As contemplated in the present invention, fractions are real numbers of the form:

"b/c"

where, b, and c are integers. The denominator is contemplated to be in the range 1 through 9999 because of restrictions in the present embodiment's architecture.

Entering Fractions

Fractions can be entered onto a memory stack register within the calculating device at any time. First, the integer characteristic part of the number (a of "a b/c") is keyed in and the decimal point key 40 is depressed. This first depression of the key 40 separates the integer characteristic part of the number from its fractional part. Second, the fraction numerator "b" is keyed in and the decimal point key 40 is pressed again. The second depression of key 40 separates the numerator from the denominator "c." Third, the denominator is keyed in. Finally, an ENTER key 50 is depressed to terminate digit entry. The number or result is formatted according to the current display mode (either fractional or decimal) as discussed more fully below.

Figure 3:
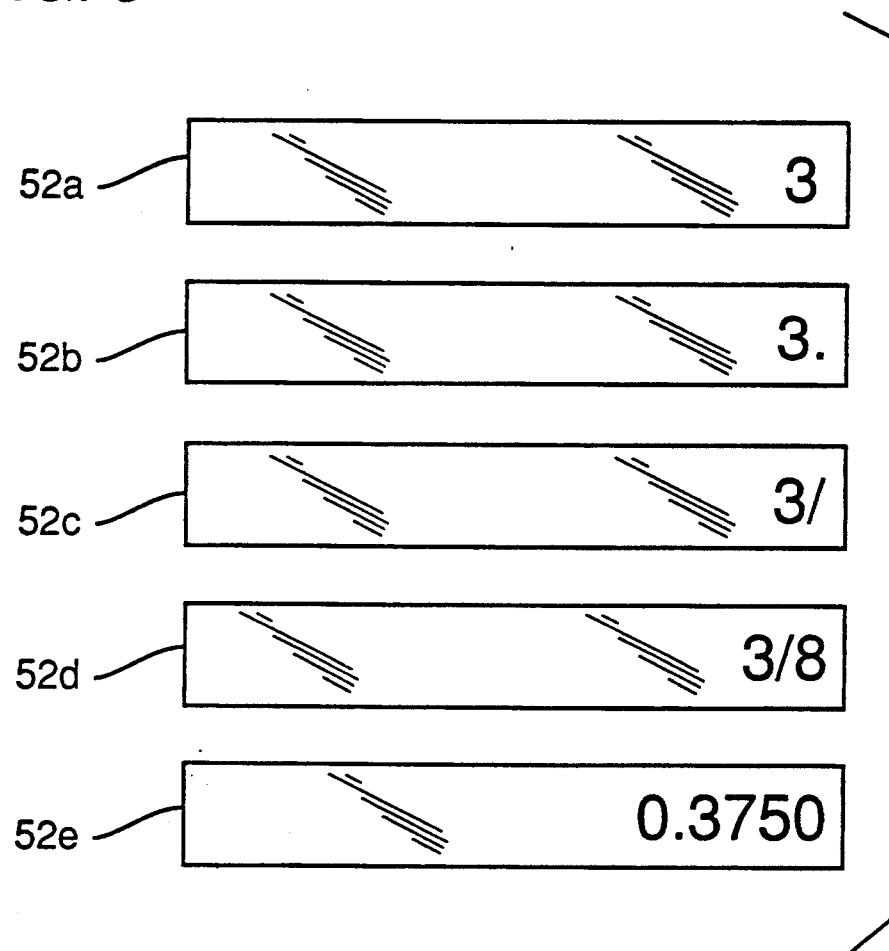
FIG. 3 is a series of screen displays illustrating the entry and display of a function according to the invention.

In accordance with the present invention, if the number entered has no characteristic integer part (for example, "⅜"), the number can be started without an integer. FIG. 3 shows a series of screen displays that illustrate the method of the invention. In screen display 52a, the digit key associated with the numeric value 3 is activated by pressing it to enter that value. Internally, CPU 38 receives the numeric value upon the keys' activation. A key having a primary function, such as decimal key 40, is then activated. This causes execution of the primary function of decimal entry. In FIG. 3, screen 52b shows entry of the decimal point after the "3." Key 40 is then pressed again to enter the decimal percent function a second time. However, the two primary functions are from a predetermined, set that the CPU determines. In response to that determination, the CPU treats the previously entered numeric value as entered into the numerator of a fraction. It may also respond by displaying a character on the display 24 indicating that the previously entered numeric value is the numerator of a fraction as shown in seven 52c. In this particular embodiment, the displayed character is a slash mark commonly recognized as a separator between the numerator and denominator of a fraction. Subsequently entered numeric values are treated as entered into the denominator of a fraction. Screen display 52d shows the numeric value "8" entered by pressing the digit key 8. The enter key 50 is then depressed. In screen display 52e, the number "0.3750" is displayed because the current display format upon entry is decimal. Alternatively, the current display format could have been fractional, as will be discussed. In that case, the "⅜" is displayed.

It should be understood that the invention is not limited to the present embodiment. Any two primary functions from a set of such functions may be chosen. In the present embodiment, the set is only the decimal point entry function, which is particularly useful because the decimal key has few alternative uses. However, other keys could be chosen, such as the decimal key in combination with the multiplication key, etc.

By recognizing primary key functions only, the method avoids the use of a shift key such as keys 28 and 30 or the use of a dedicated fraction entry key such as taught in the prior art.

Figure 4:
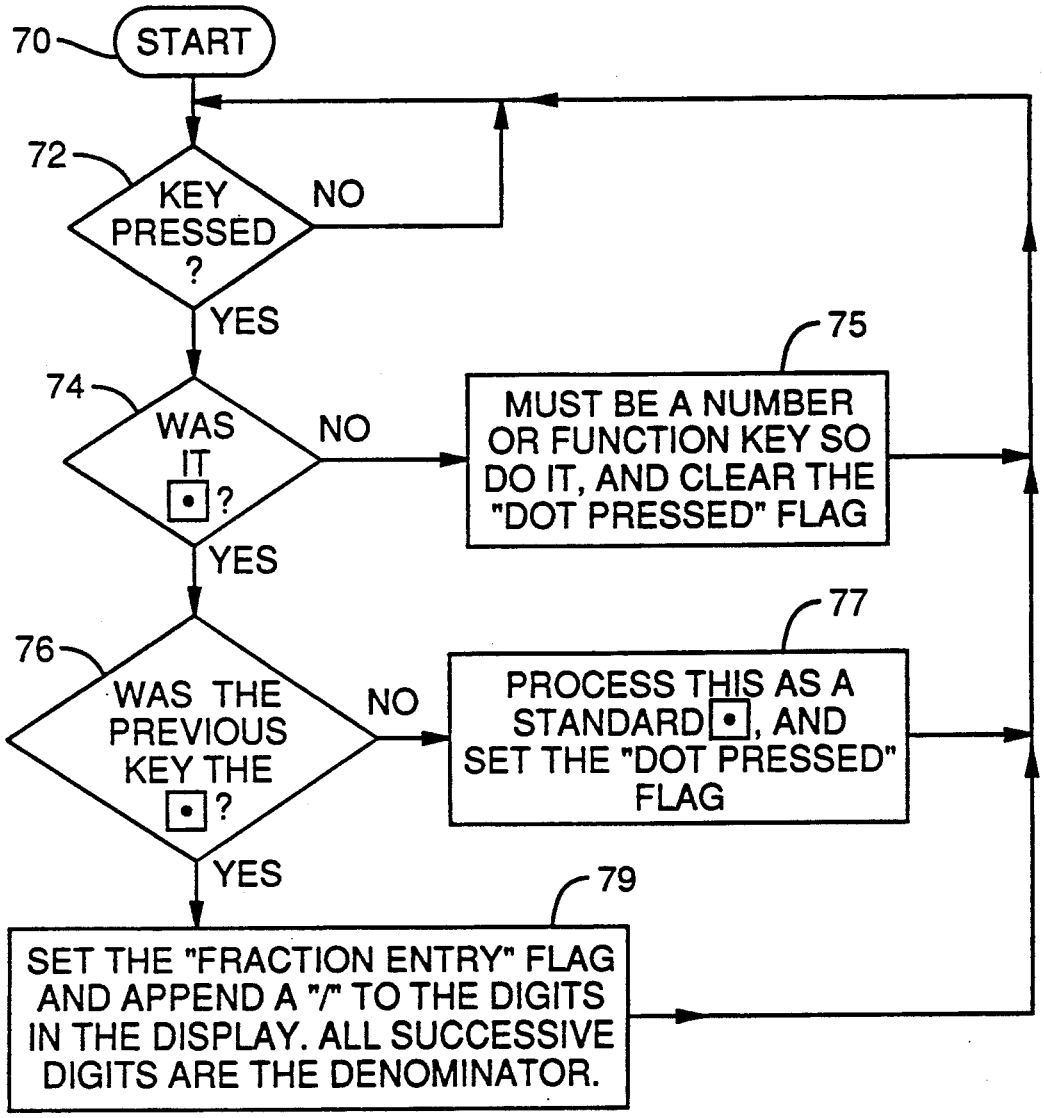
FIG. 4 shows a flow chart of a method for fraction entry in accordance with the present invention.

Referring now to FIG. 4, the method for fraction entry in accordance with the invention is illustrated. At the start position 70, the calculator 20 is energized, and is placed in the default decimal-display mode. The CPU 38 awaits input from the keyboard 22. This is shown in FIG. 4 at 72 decision block. Eventually, a key is depressed by the user. The CPU 38 determines in decision block 74 if that depression was the decimal point key 40. If not, the central processing unit determines that that first key depression must have been either a digit or a function key. The key's function is then implemented and a "decimal point depressed" flag is cleared as shown in block 75. Thereafter, the CPU returns to a wait condition at block 72 and awaits the next key depression. If, at block 74, the CPU now determines that the decimal point key 40 has been depressed, the CPU makes a further determination at block 76 whether the previous key depressed was also the decimal key 40 by checking the flag. If the answer to this second inquiry is no, the CPU processes this first activation of the decimal key 40 as a standard decimal point entry and consequently sets the "decimal point depressed" flag as shown in block 77. Subsequently, the CPU again awaits a further key consecutive activation. If the answer to the second query, at block 76, is yes, the CPU sets the "fraction entry" flag and appends a "/" to the digits on the display 24 as shown in block 79. At this juncture, this consecutive entry of the decimal point function is interpreted by the CPU 38 as a command to treat the previously entered numeric value as entered into the numerator of a fraction and a subsequently entered numeric value as entered into the denominator of the fraction. Finally, the central processing unit returns to its input await state at block 72.

Using the above-procedure of the invention, a user may enter almost any number as a fraction on the keyboard 22 of the calculator 20. This includes an improper fraction where the numerator is larger than the denominator. However, a typical calculator 20 will display an error sign if the user disregards embodiment architecture restrictions.

Displaying Fractions

When the calculator 20 used with the invention is initially energized, it will cause any entered values to be displayed in decimal format. The decimal-display mode is the default display mode. When the user desires to perform mathematical computations incorporating fractional numbers in the form "b/c," the CPU 38 can be reset to a fraction-display mode. This is accomplished through depression of keys 28 and 40 in combination in the present embodiment. This key sequence switches between fraction-display mode and the default decimal-display mode.

In the fraction-display mode, numbers are evaluated internally as decimal numbers and subsequently displayed on display 24 using the most precise fractions allowed. Implementation of this mode is as follows: First, using the above example, the key sequence: "3," ".", ".", 8 is depressed. This displays characters as they are keyed in. "⅜_" is displayed on display 24. An ENTER key 50 is depressed. This terminates digit entry and displays the number in the current default decimal display format as mentioned above, with reference to FIG. 3. The shifted key combination 28, and may then be 40, is depressed. This displays the number as a fraction, "⅜."

To further the example, and in accordance with the present invention, "⅜" can now be added to the number in a memory register (stack). The key sequence: "3", ".", ".", "4" is depressed. This displays characters as the user keys them in. "¾" is displayed. Next, the (+) key 62 is depressed. This keystroke adds the numbers in the X- and Y-registers of device 20 and displays the result as a fraction. The key sequence: ENTER 50 and shifted key combination 20, 40 may be depressed. This switches the display format back to the decimal.

Having described and illustrated the principles of the contemplated invention with reference to a preferred embodiment, it should be apparent to those skilled in the art that the invention can be modified in arrangement and detail without departing from such principles. We claim all such modifications coming within the scope and spirit of the following claims.

We claim:

1. A calculating device, comprising:

(a) a display;
(b) a keyboard having a plurality of keys including keys for entering numeric values and keys for executing primary functions; and
(c) processing means for:
receiving an entered numeric value upon activation of a numeric key;
receiving an entered primary function upon activation of a function key;
receiving a second, consecutively entered primary function upon activation of a function key;
determining if the two primary functions are from a predetermined set of primary functions; and
in response to such a determination, interpreting the previously entered numeric value as entered into the numerator of a fraction and a subsequently entered numeric value as entered into the denominator of the fraction.

2. The calculating device of claim 1 wherein the processing means, in response to such recognition, further displays a fraction indicating character on the display for indicating that the previously entered numeric value is entered into the numerator of a fraction and that a subsequently entered numeric value is entered into the denominator of the fraction.

3. The calculating device of claim 1 wherein the predetermined set includes the decimal point function, and the processing means recognizes successive activation of the decimal point key as indicating a fraction is being entered.

4. In a calculating device having a CPU, a keyboard and a display, a method of entering and displaying fractions, comprising:
entering a numeric value;
evaluating a first entry from the keyboard to determine if it is a primary function that is a member of a predetermined set;
evaluating a second, consecutive entry from the keyboard to determine if it is a primary function that is part of the predetermined set; and
in response to such a determination, displaying the previously entered numeric value as entered into the numerator of a fraction and a subsequently entered numeric value as entered into the denominator of the fraction.

5. The method of claim 4 including displaying a fraction indicating character after the numeric value entered into the numerator for indicating such entry.

6. The method of claim 4 wherein the first and second entries are entries of the decimal point function.

7. In a calculating device having a CPU, a keyboard and a display, a method of determining entry of a fraction, comprising:
entering a numeric value;
evaluating a first entry from the keyboard to determine if it is a primary function from a predetermined set of primary functions;
in response to such a determination, setting a flag;
evaluating a second entry from the keyboard to determine if it is a primary function from the predetermined set of primary functions and if the flag is set; and
in response to a determination that the flag is set and the second entry is from the predetermined set, interpreting the previously entered numeric value as entered into the numerator of a fraction and a subsequently entered numeric value as entered into the denominator of the fraction.

8. The method of claim 7 including clearing the flag if the second, consecutive entry is not from the predetermined set.

9. The method of claim 7 wherein the first and second entries are entries of the decimal point function.

* * * * *